United States Patent [19]

Kumamoto

[11] Patent Number: 5,519,500
[45] Date of Patent: May 21, 1996

[54] SYNCHRONIZATION SIGNAL GENERATING CIRCUIT

[75] Inventor: Hidechika Kumamoto, Osaka, Japan

[73] Assignee: Mita Industrial Co., Ltd., Osaka, Japan

[21] Appl. No.: 61,882

[22] Filed: May 14, 1993

[30]   Foreign Application Priority Data

May 22, 1992  [JP]  Japan .................................. 4-130865

[51] Int. Cl.$^6$ ................................ H04N 1/23; B41J 2/47
[52] U.S. Cl. ............................................ 358/296; 347/250
[58] Field of Search ................................ 358/296, 300; 347/248, 250, 247, 132

[56]   References Cited

U.S. PATENT DOCUMENTS 4,905,022   2/1990   Nagasawa ............................. 358/296
5,194,879   3/1993   Kotabe et al. ........................ 358/300

Primary Examiner—Scott A. Rogers
Attorney, Agent, or Firm—Jordan and Hamburg

[57]   ABSTRACT

A synchronization signal generating circuit generates a synchronization signal used to output read data sequentially in a specified period. This circuit is provided with a clock generator means for generating a reference clock, a first counter unit for counting the reference clock; a synchronization signal generator for generating the synchronization signal in a first period in accordance with a count value of the first counter unit; a second counter unit for counting the generation of the synchronization signal; a resetter for resetting the second counter unit when a count value of the second counter unit reaches a specified value; and a period changer for controlling the synchronization signal generator so as to generate the synchronization signal in a second period only when the count value of the second counter unit reaches the specified value. Accordingly, a shift amount of the period of the synchronization signal relative to the specified period in which data are output sequentially does not exceeds a predetermined level.

6 Claims, 10 Drawing Sheets

SYNCHRONIZATION SIGNAL GENERATING CIRCUIT

BACKGROUND OF THE INVENTION AND RELATED ART STATEMENT

This invention relates to a synchronization signal generating circuit which enables the adjustment of a period of a synchronization signal (hereinafter referred to as a sync signal) used, for example, in an image forming apparatus.

In a conventional image forming apparatus of the solid state scan system in which a photosensitive member is exposed to light emitted, for example, from light emitting diodes (LEDs) arranged in a line, there is provided a sync signal generating circuit as follows. A counter starts counting a reference clock output from a crystal oscillator using, for example, a copy start signal as a reference signal. Each time a count value reaches a preset value, the sync signal generating circuit generates a horizontal sync signal and sends the same to an image output unit. The image output unit outputs an image data in a main scanning direction to the LEDs in synchronism with the horizontal sync signal, so that the image can be formed.

However, an oscillation frequency of the crystal oscillator tends to vary slightly due to a production error or the like. If the variation of the oscillation frequency causes the period of the horizontal sync signal to shift from the one required in the image output unit, its shift amount increases gradually. As a result, the output of the image data from the image output unit cannot be synchronized with the horizontal sync signal properly, thereby causing the image distortion or the like.

Considering the above problem, it may be thought to change the set value for each crystal oscillator according to the variation of the oscillation frequency so as to obtain the horizontal sync signal of a desired period. However, the period of the horizontal sync signal can be set only as a multiple of the period of the reference clock. Thus, in the case where the period of the horizontal sync signal shifts from the period required as such by less than the reference clock, the horizontal sync signal of the required period cannot be obtained by changing the set value.

SUMMARY OF THE INVENTION

In view of the foregoing problems, it is an object of the invention to provide a sync signal generating circuit which prevents a shift amount of a period of a horizontal signal relative to the one required as such from accumulatively increasing.

Accordingly, the invention is directed to a synchronization signal generating circuit for generating a synchronization signal used to output read data sequentially in a specified period, comprising clock generator means for generating a reference clock; first counter means for counting the reference clock; synchronization signal generator means for generating the synchronization signal in a first period in accordance with a count value of the first counter means; second counter means for counting the generation of the synchronization signal; reset means for resetting the second counter means when a count value of the second counter means reaches a specified value; and period changer means for controlling the synchronization signal generator means so as to generate the synchronization signal in a second period only when the count value of the second counter means reaches the specified value.

With this synchronization signal generating circuit, the reference clock is counted and the synchronization signal is generated in the first period based on the counted number of the reference clocks. A number of the generated synchronization signal is counted, and the synchronization signal is generated in the second period only when this number reaches the specified value. Accordingly, a shift amount of the period of the synchronization signal relative to the specified period in which data are output sequentially does not exceeds a predetermined level.

The synchronization signal generator means may advantageously generate the synchronization signal each time the count value of the first counter means reaches a first predetermined value. The period changer means may advantageously control the synchronization signal generator means so as to generate the synchronization signal when the count value of the first counter means reaches a second predetermined value only if the count value of the second counter means reaches the specified value.

Further, the synchronization signal generator means may preferably include designation signal output means for outputting a designation signal and signal generator means for generating the synchronization signal upon the receipt of the designation signal. The designation signal output means may desirably include first output means for outputting the designation signal each time the count value of the first counter means reaches a predetermined value and second output means for outputting the designation signal at a timing delayed by a specified number of reference clocks from the first output means. The period changer means may connect switchingly the first and second output means only when the count value of the first counter means reaches the predetermined value.

Specifically, the period changer means may connect the second output means with the signal generator means only in the case where the count value of the first counter means reaches the predetermined value and connects the first output means therewith in other cases.

With this arrangement, the synchronization signal is generated upon the receipt of the designation signal from the first output means each time the count value of the first counter means reaches the predetermined value. The connection of the signal generator means with the first output means is changed to that with the second output means only when the synchronization signal has been generated the predetermined number of times. This extends the period of the synchronization signal. As a result, when a period in which the count value of the first counter means reaches the predetermined value is shorter than the specified period which the data are output sequentially, a shift amount of the period of the synchronization signal relative to the specified period is reduced and therefore does not exceed the predetermined level.

The period changer means may connect the first output means with the signal generator means only in the case where the count value of the first counter means reaches the predetermined value and connects the second output means therewith in other cases.

With this arrangement, the connection of the signal generator means with the second output means is changed to that with the first output means only when the synchronization signal has been generated the predetermined number of times. This shortens the period of the synchronization signal. As a result, when a period in which the count value of the first counter means reaches the predetermined value is longer than the specified period in which the data are output sequentially, the shift amount of the period of the synchronization signal relative to the specified period is reduced and therefore does not exceed the predetermined level.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
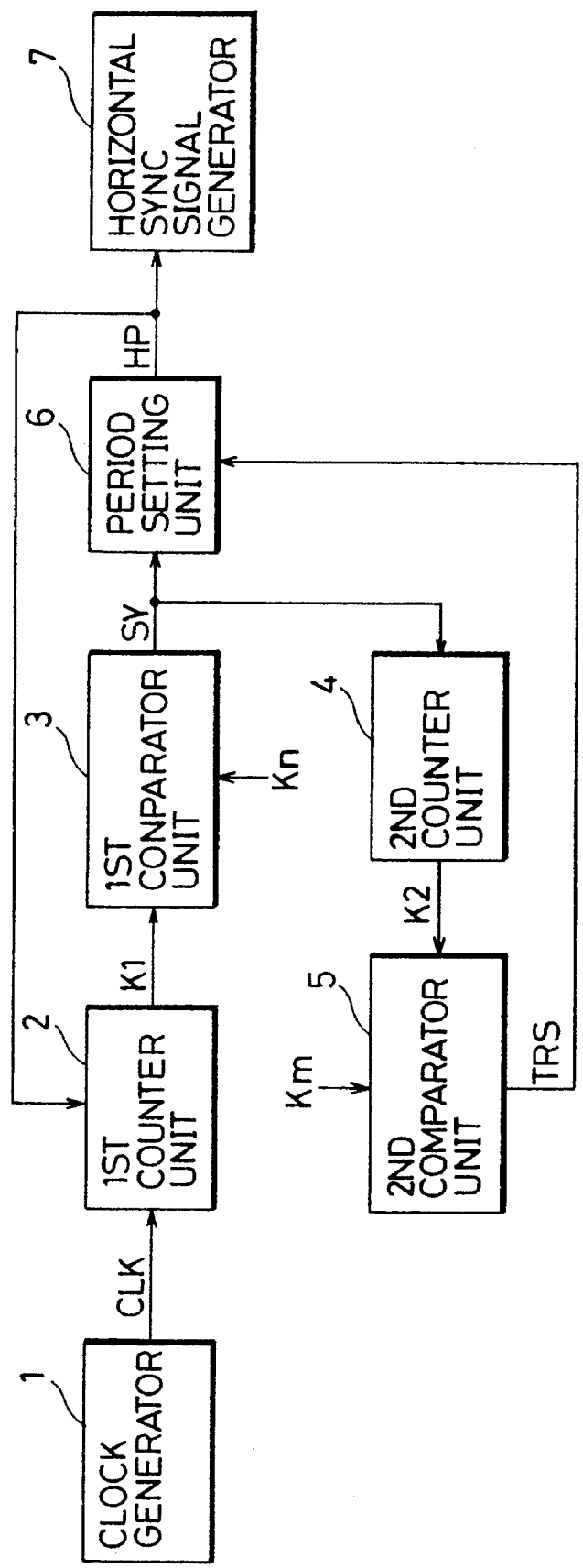
FIG. 1 is a block diagram showing a construction of a first sync signal generating circuit embodying the invention.
Figure 2A:
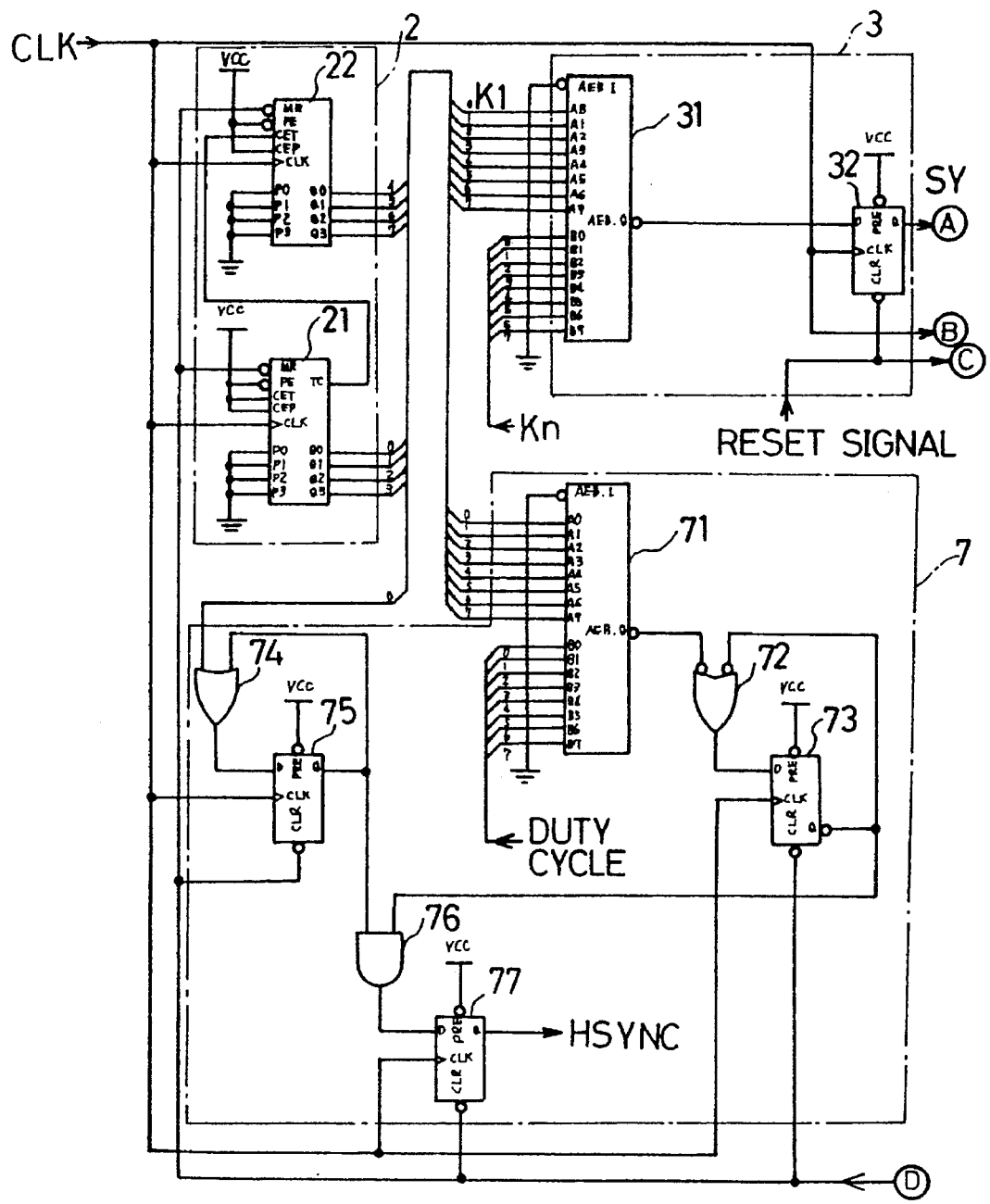
FIGS. 2A, 2B are circuit diagrams showing the first sync signal generating circuit.
Figure 2B:
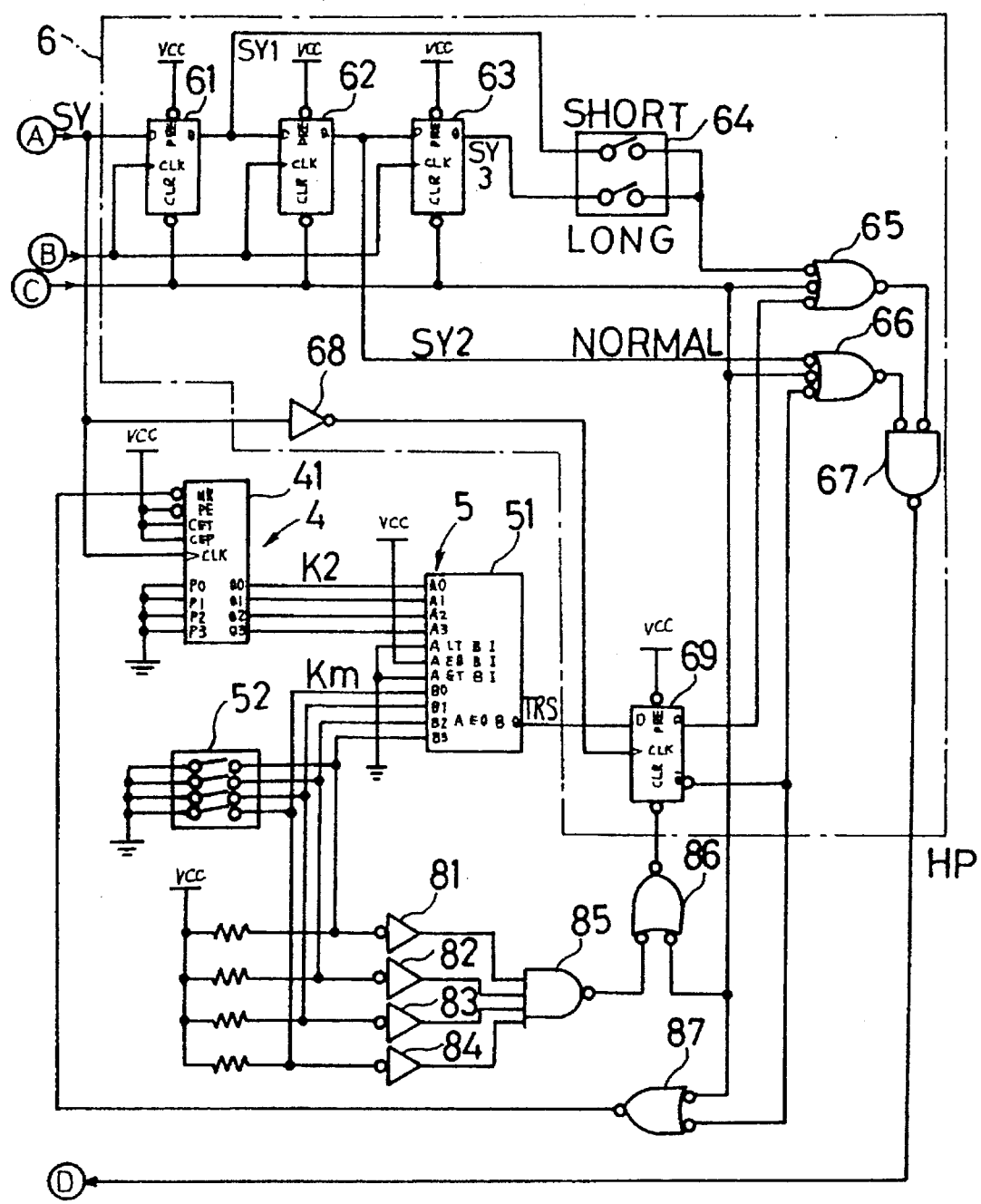

A first embodiment of a sync signal generating circuit according to the invention will be described with reference to FIGS. 1 to 3B. FIG. 1 is a block diagram showing a construction of this sync signal generating circuit, and FIGS. 2A, 2B are circuit diagrams showing essential portions thereof.

The sync signal generating circuit is provided with a clock generator 1, a first counter unit 2, a first comparator unit 3, a second counter unit 4, a second comparator unit 5, a period setting unit 6, and a horizontal sync signal generator 7.

The clock generator 1 includes a crystal oscillator or the like, and sends a reference clock CLK of a preset period to the first counter unit 2. The first counter unit 2 includes counters 21, 22, and is adapted for counting and sending the reference clock CLK as a count value K1 of eight bits to the first comparator unit 3. Upon the input of a sync pulse HP from the period setting unit 6, the counters 21, 22 reset the count values thereof.

The first comparator unit 3 includes a comparator 31 and a flip-flop 32. The comparator 31 compares the count value K1 from the first counter unit 2 with a value Kn of eight bits preset by an unillustrated switch or the like. When the count value K1 reaches the set value Kn, the comparator 31 sends a low level signal to the flip-flop 32. The flip-flop 32 sends the signal input from the comparator 31 in synchronism with the reference clock CLK. In other words, the flip-flop 32 sends to the second counter unit 4 and the period setting unit 6 a low level sync timing signal SY which is used to generate a horizontal sync signal.

The second counter unit 4 includes a counter 41, and is adapted for counting the sync timing signal SY sent from the first comparator unit 3 and sending a count value K2 of four bits to the second comparator unit 5.

The second comparator unit 5 includes a comparator 51 and a setting switch 52. The comparator 51 compares the count value K2 with a value Km preset by the setting switch 52. When the count value K2 reaches the set value Km, i.e. the sync timing signal SY is output Km times, the comparator 51 sends a period change designation signal TRS of high level to the period setting unit 6.

The period setting unit 6 includes flip-flops 61 to 63, a setting switch 64, gate circuits 65 to 67, and an inverter 68. Upon the receipt of the sync timing signal SY from the first comparator unit 3, the period setting unit 6 sends the sync pulse HP of a specified period to the horizontal sync signal generator 7 and the first counter unit 2. Upon the receipt of the period change designation signal TRS from the second comparator unit 5, the period setting unit 6 changes the period of the sync pulse HP so as to change the period of the horizontal sync signal according to the value preset by the setting switch 64. The period setting unit 6 will be described more in detail later.

The horizontal sync signal generator 7 includes a comparator gate circuits 72, 74, 76, and flip-flops 73, 75, 77. Upon the receipt of the sync pulse HP from the period setting unit 6, the generator 7 sends a horizontal sync signal HSYNC having a duty cycle preset by an unillustrated switch or the like.

There will be described in detail each circuit constituting the period setting unit 6.

Figure 3A:
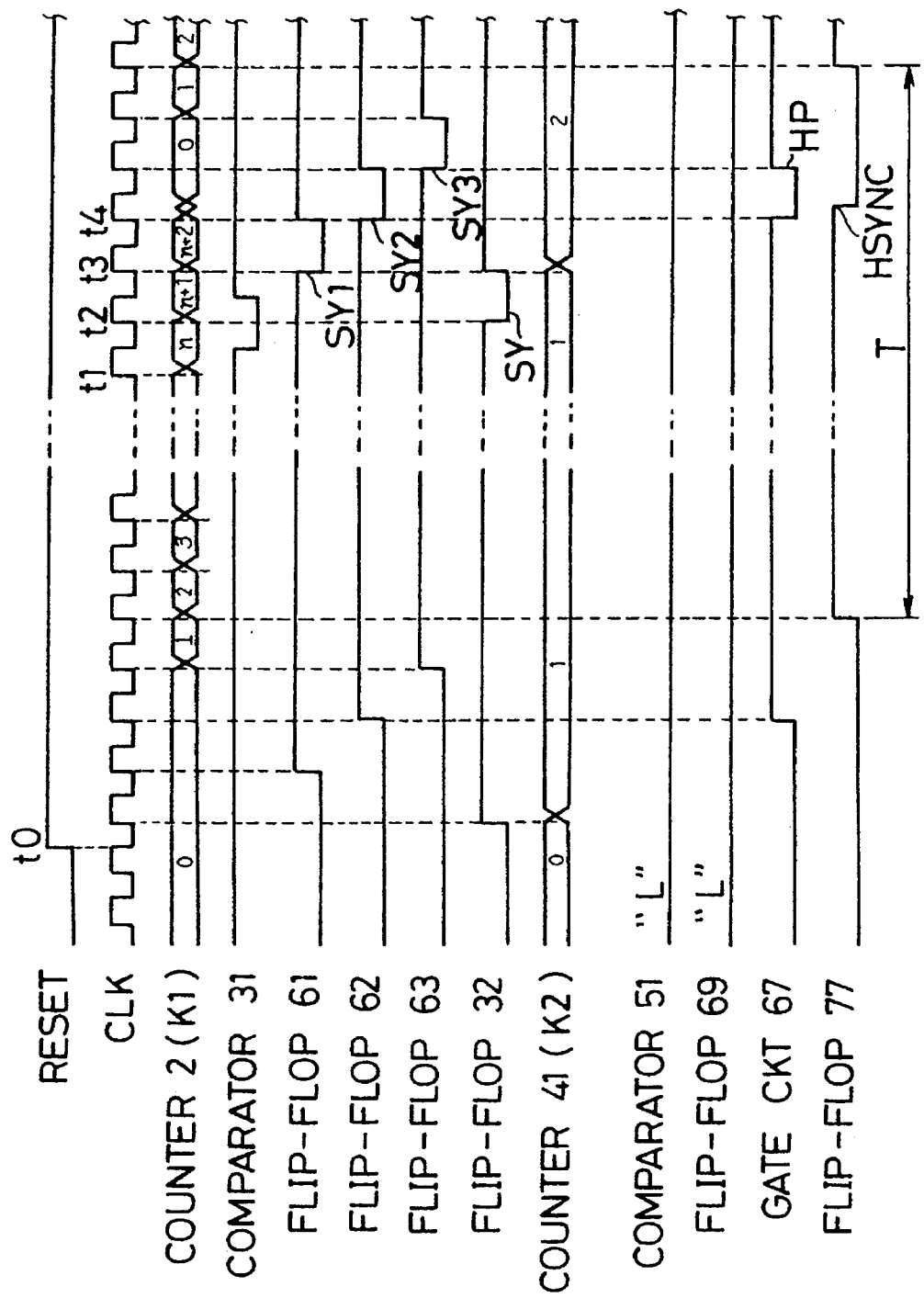
FIGS. 3A, 3B are timing charts showing a signal level of each part constituting the first sync signal generating circuit.

The flip-flops 61 to 63 set the period of the horizontal sync signal HSYNC. The flip-flop 61 sends to a switch portion SHORT of the setting switch 64 a pulse SY1 delayed from the sync timing signal SY from the flip-flop 32 by one reference clock CLK as shown in FIG. 3A. The flip-flop 62 sends a pulse SY2 delayed from the pulse SY1 by one reference clock CLK1, i.e. delayed from the sync timing signal SY by two reference clocks CLK, to the gate circuit 66 so as to set a normal period (NORMAL) of the horizontal sync signal HSYNC. The flip-flop 63 sends a pulse SY3 delayed from the pulse SY2 by one reference clock CLK, i.e. delayed from the sync timing signal SY by three reference clocks CLK, to a switch portion LONG of the setting switch 64.

The setting switch 64 adjusts the period of the horizontal sync signal HSYNC, and has either one of the switch portions SHORT, LONG connected. The pulse SY1 is sent to the gate circuit 65 when the switch portion SHORT is connected, whereas the pulse SY3 is sent thereto when the switch portion LONG is connected.

The flip-flop 69 normally outputs a low level signal through an output terminal Q1 and a high level signal through an output terminal Q2. Upon the receipt of the high level period change designation signal from the comparator 51, the flip-flop 69 outputs the high level signal to the gate circuit 65 through the output terminal Q1 while outputting the low level signal to the gate circuit 66 through the output terminal Q2 in synchronism with the sync timing signal SY.

The gate circuit 66 outputs a low level signal when either one of the reset signal input from the outside of the sync signal generating circuit, the signal input from the output terminal Q2 of the flip-flop 69, and the signal input from the flip-flop 62 is low. Accordingly, when the reset signal is high and the signal input from the output terminal Q2 of the flip-flop 69 is high, the low level pulse SY2 input from the flip-flop 62 is output to the gate circuit 67.

The gate circuit 65 outputs a low level signal when either one of the reset signal, the signal input from the output terminal Q1 of the flip-flop 69, and the signal from the setting switch 64 is low. Accordingly, when the reset signal is high and the signal input from the output terminal Q1 of the flip-flop 69 is high, the low level pulse SY1 or SY3 input from the setting switch 64 is output to the gate circuit 67.

The gate circuit 67 outputs a low level signal when any of the input signals from the gate circuits 65, 66 is low. The gate circuit 67 outputs the low level pulse signals input from the gate circuits 65, 66 as the sync pulse HP to the flip-flop 75 as well as to the counters 21, 22.

A gate circuit 87 outputs a low level signal when either one of the reset signal and the signal input from the output terminal Q2 of the flip-flop 69 is low. In the case where the low level signal is output from the output terminal Q2 of the flip-flop 69 when the reset signal is high, the gate circuit 87 outputs a low level signal so as to reset the counter 41. In this way, the counter 41 is reset each time the sync timing signal SY is output Km times.

Inverters 81 to 84 and gate circuits 85, 86 hold the outputs from the output terminals Q1, Q2 of the flip-flop 69 when respective contacts of the setting switch 52 are all on. In other words, the value Km is set at 0000 by turning on all the contacts of the setting switch 52 in the case where the period of the horizontal sync signal is not changed. In this case, the low level signal is output from the output terminal Q1 of the flip-flop 69 while the high level signal is output from the output terminal Q2 thereof regardless of the output of the comparator 51. Thus, the pulse SY2 is output to the gate circuit 67 constantly as the sync pulse HP regardless of the count value K2.

Figure 3B:
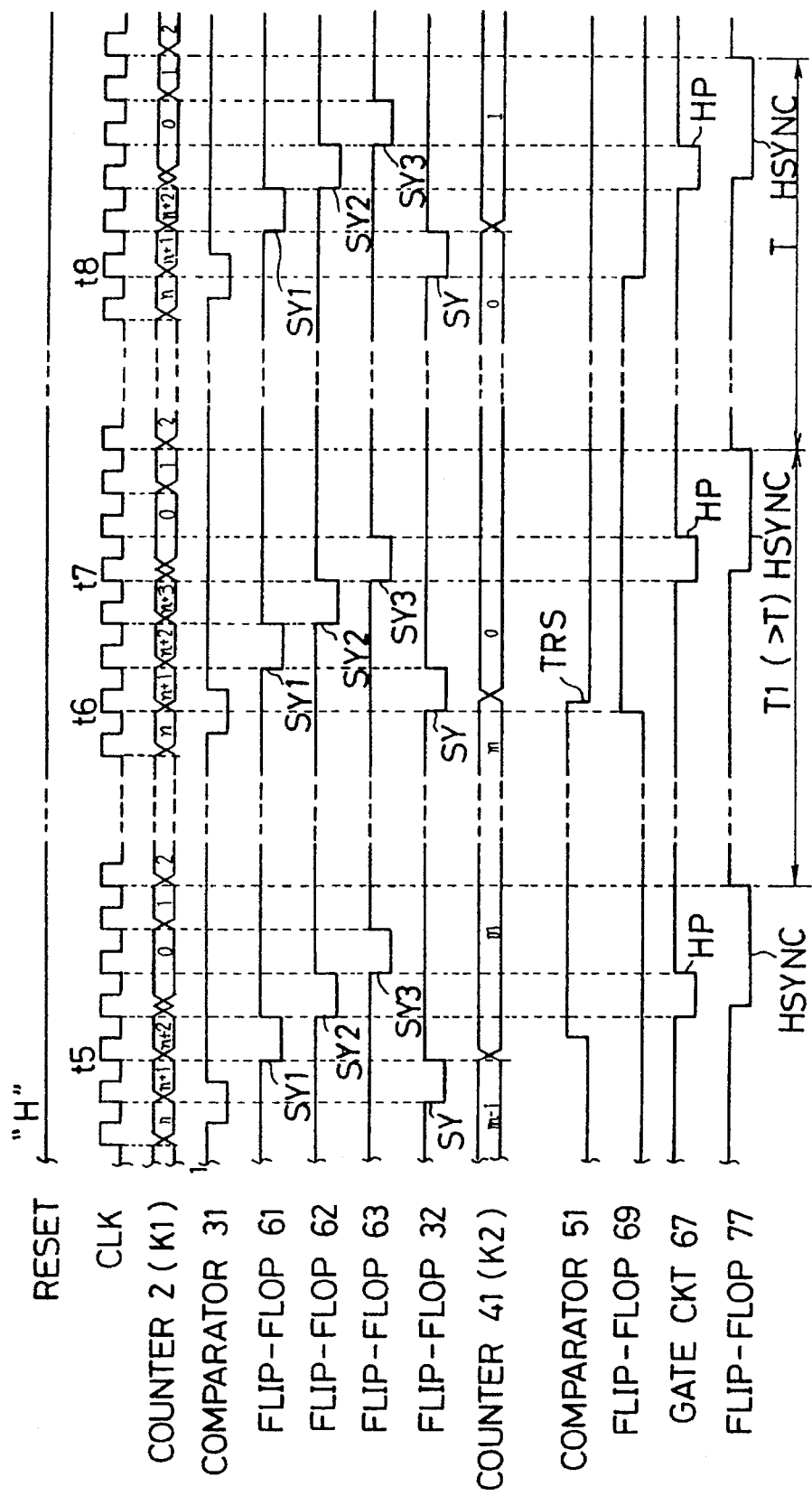

There will be described operations of the respective parts of the sync signal generating circuit next with reference to timing charts shown in FIGS. 3A, 3B. Let it be assumed that Kn=n, Km=m, and the switch portion LONG is connected in the setting switch 64.

When the reset signal rises from low level to high level at time t0 upon the application of power, the output signal of the flip-flop 32 rises in synchronism with a next reference clock CLK and thereby the count value K2 of the counter 41 becomes equal to 1. When the output signal of the gate circuit 67 becomes high upon the rise of the output signal of the flip-flop 62, the counters 21, 22 start counting the reference clock CLK from the clock generator 1 and the count value K1 thereof is output as in the form of 0, 1, . . . . When the count value K1 becomes equal to n at time t1, the output of the comparator 31 is inverted from high level to low level.

At time t2 following this inversion, the output of the flip-flop 32 inverts from high level to low level in synchronism with the rise of the reference clock CLK and thereby the flip-flop 32 outputs the sync timing signal SY. When the count value K1 becomes equal to (n+1), the output of the comparator 31 inverts from low level to high level. In association with this inversion, the output of the flip-flop 32 inverts from low level to high level at time t3. The counter 41 counts up in synchronism with the rise of the sync timing signal SY from the flip-flop 32 and the count value K2 becomes equal to 2.

On the other hand, since the flip-flop 69 outputs the low level signal to the gate circuit 65 and the high level signal to the gate circuit 66, the high level signal is output from the gate circuit 66 to the gate circuit 67 while the low level signal is output from the gate circuit 65 thereto.

Thus, upon the output of the pulse SY2 from the flip-flop 62 at time t4, this pulse SY2 is output as the sync pulse HP to the horizontal sync signal generator 7 through the gate circuits 66, 67. The horizontal sync signal HSYNC having a normal period T is generated in accordance with the sync pulse HP. Further, the counters 21, 22 are reset in accordance with the sync pulse HP. The horizontal sync signal HSYNC having the normal period T is generated repeatedly until the count value K2 becomes equal to m as shown in FIG. 3B.

On the other hand, when the count value K2 of the counter 41 becomes equal to m at time t5, the output of the comparator 51 inverts from low level to high level and thereby the comparator 51 outputs the period change designation signal TRS. At time t6, the high level signal is output to the gate circuit 65 from the output terminal Q1 of the flip-flop 69 and the low level signal is output to the gate circuit 66 from the output terminal Q2 thereof in synchronism with the inversion of the output of the flip-flop 32, i.e. in synchronism with the pulse SY. Thus, the low level signal is output from the gate circuit 66, and the pulse SY3 which is output when the count value K1 becomes equal to (n+3) at time t7 and is delayed from the pulse SY2 by one reference clock CLK is output as the sync pulse HP to the horizontal sync signal generator 7 through the setting switch 64 and the gate circuits 65, 67. In accordance with this sync pulse HP, the horizontal sync signal HSYNC having a period T1 (>T) is generated.

The counter 41 is reset at time t6, and the low level signal is output to the gate circuit 65 from the output terminal Q1 of the flip-flop 69 and the high level signal is output to the gate circuit 66 from the output terminal Q2 thereof at time t8. In this way, the low level signal is output from the gate circuit 65 and the output signal of the flip-flop 62 is output from the gate circuit 66. Thus, the pulse SY2 is output as the sync pulse HP to the horizontal sync signal generator 7 and the horizontal sync signal HSYNC having the normal period T is generated again.

Each time the count value K2 of the sync timing signal SY used to generate the horizontal sync signal HSYNC becomes equal to m, the horizontal sync signal HSYNC having a period shorter or longer than the normal period T is generated in accordance with the state of the setting switch 64. Accordingly, it can be prevented to increase a shift amount of the period of the horizontal sync signal HSYNC relative to the required period.

In the construction shown in FIG. 1, the first counter unit 2 may be reset upon the receipt of the pulse SY, so that the sync pulse HP from the period setting unit 6 is output only to the horizontal sync signal generator 7.

Figure 4:
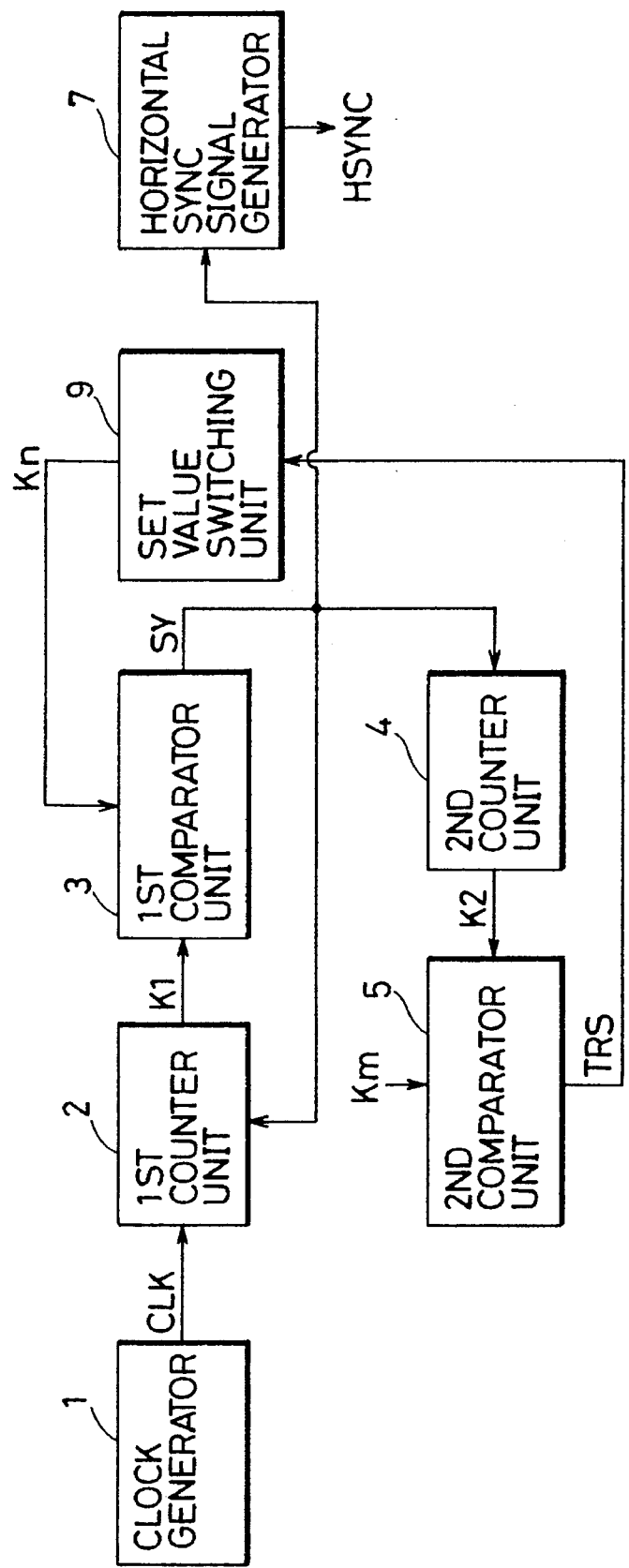
FIG. 4 is a block diagram showing a construction of a second sync signal generating circuit embodying the invention.
Figure 5A:
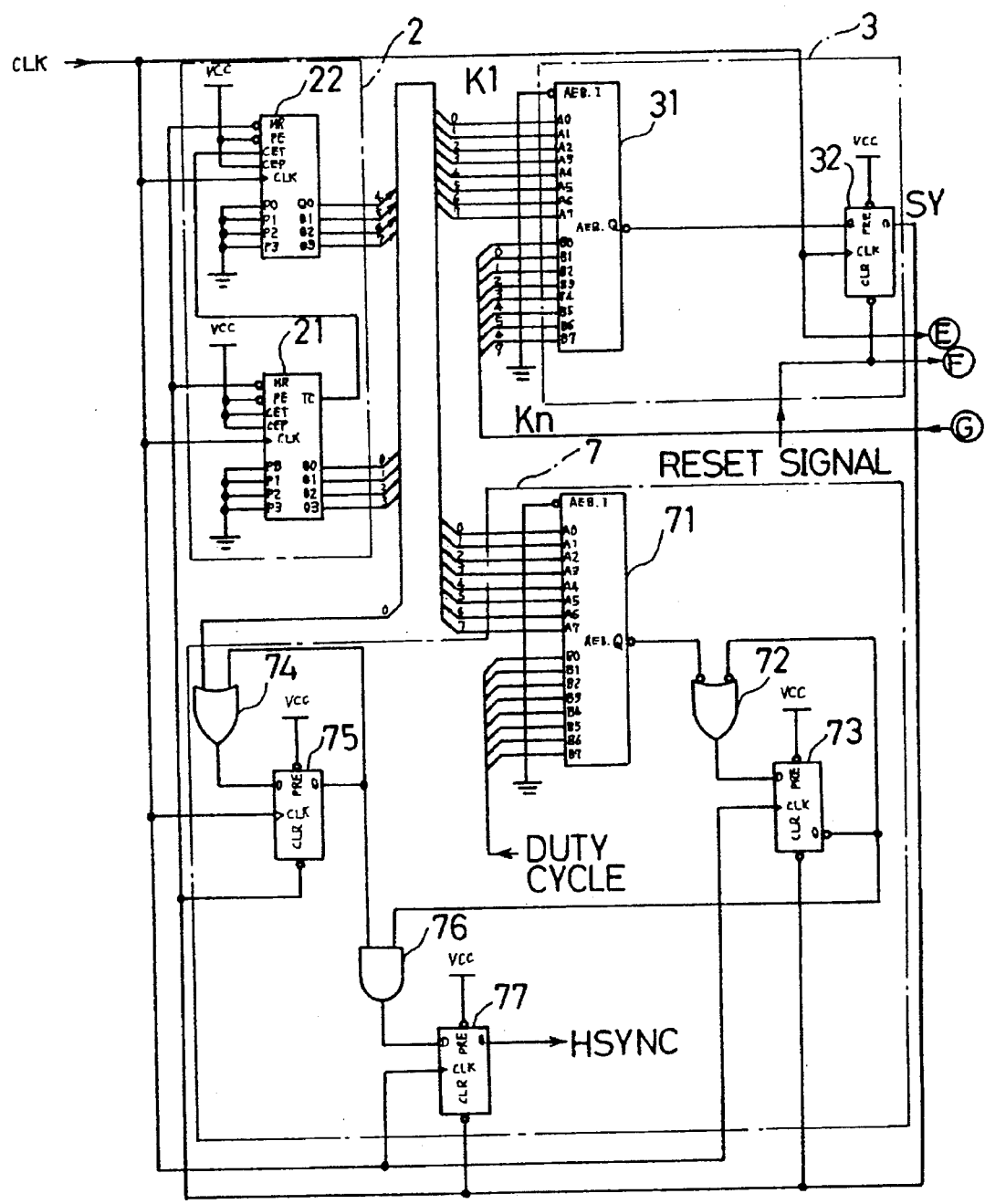
FIGS. 5A, 5B are circuit diagrams showing the first sync signal generating circuit.
Figure 5B:
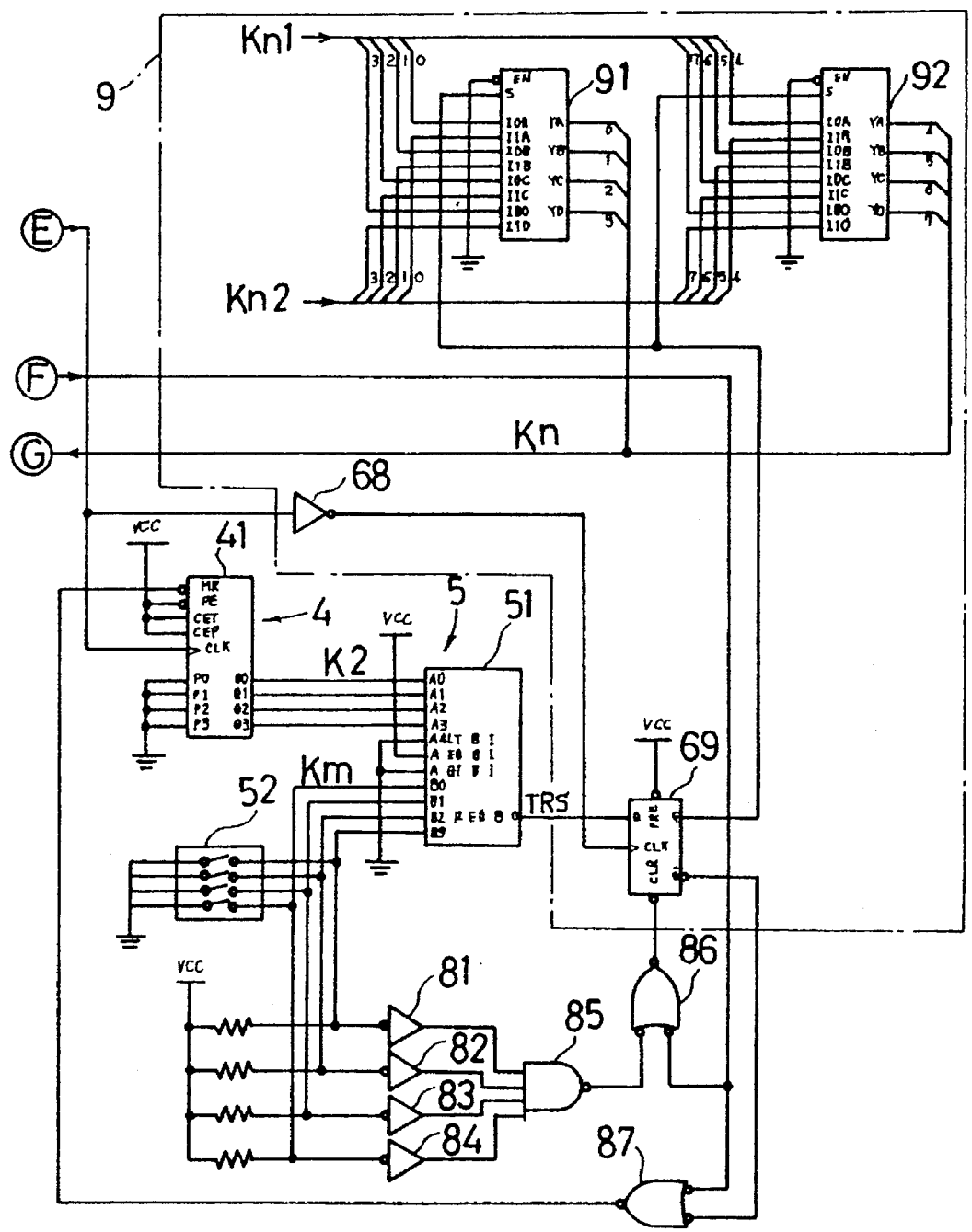

There will be described a second sync signal generating circuit embodying the invention next with reference to FIGS. 4. 5A, 5B. In these figures, like reference numerals designate like parts shown in FIGS. 1 to 2B and having identical functions.

In this second embodiment, a set value switching unit 9 is provided in place of the period setting unit 6 of the first embodiment. This switching unit 9 includes an inverter 68, a flip-flop 69, and switch circuits 91, 92, and changes a normal value Kn1 to a corrected value Kn2 as a set value Kn for a first comparator unit 3 each time a horizontal sync signal HSYNC is output Km times.

More specifically, eight bit values Kn1, Kn2 set through an unillustrated setting switch are input to the switch circuits 91, 92. In the case where a low level signal is input from an output terminal Q1 of the flip-flop 69, the normal value Kn1 is output to a comparator 31. On the other hand, in the case where a high level signal is input, i.e. a sync timing signal SY for generating a horizontal sync signal HSYNC is output Km times, the corrected value Kn2 is output to the comparator 31.

Figure 6A:
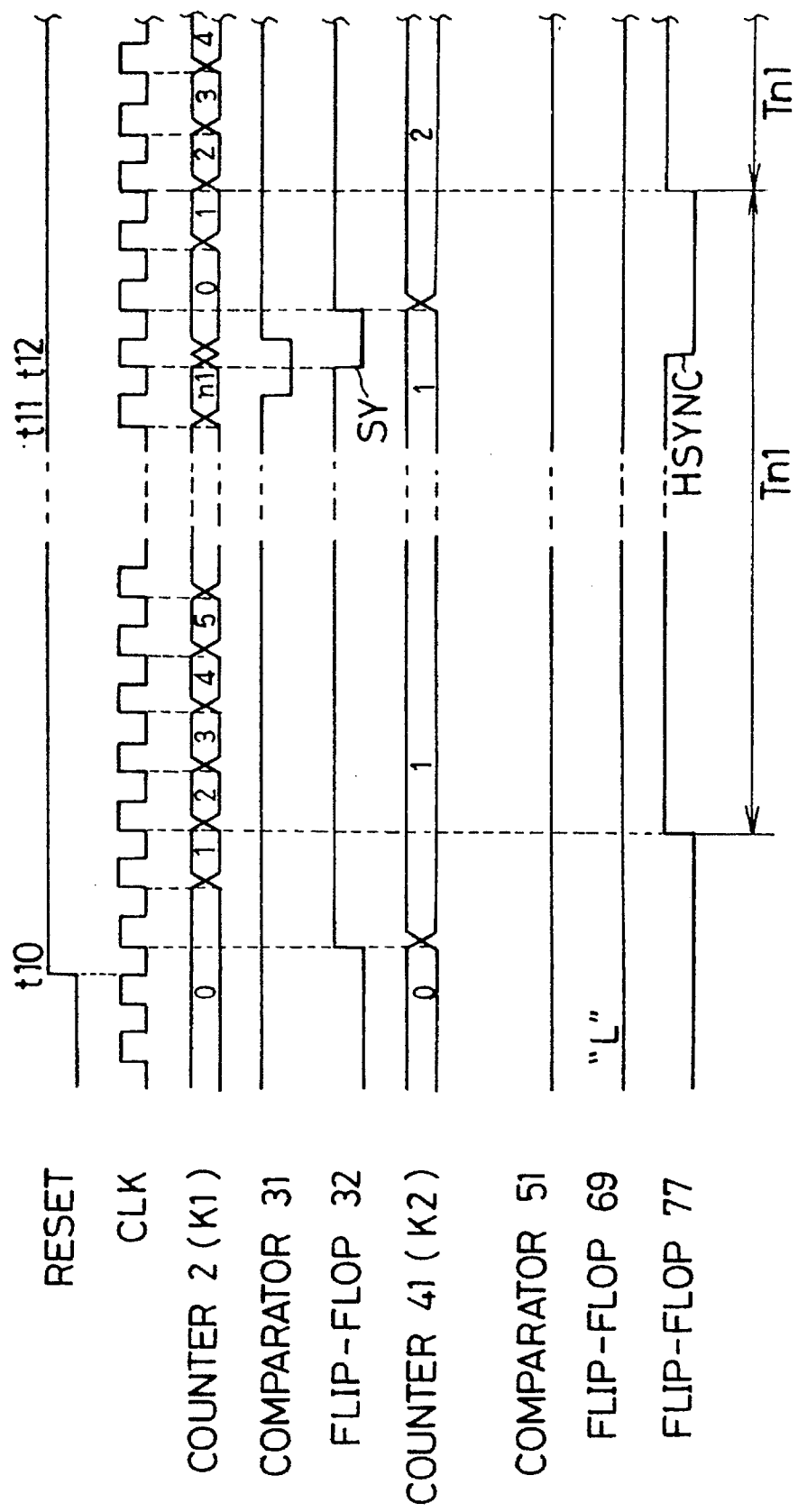
FIGS. 6A, 6B are timing charts showing a signal level of each part constituting the second sync signal generating circuit.

There will be described an operation of the second sync signal generating circuit with reference to timing charts shown in FIGS. 6A, 6B. Let it be assumed that Kn1=n1, Kn2=n2, and the low level signal is output from the output terminal Q1 of the flip-flop 69 at the start of the operation.

When a reset signal is inverted from low level to high level at time t10 upon the application of power, an output signal of a flip-flop 32 rises in synchronism with a next reference clock CLK, and thereby a count value K2 of a counter 41 becomes equal to 1. Further, in synchronism with the next reference clock CLK, counters 21, 22 start counting the reference clock CLK from a clock generator 1, and outputs a count value K1 thereof as in the form of 0, 1, . . . . . Since the low level signal is output from the output terminal Q1 of the flip-flop 69 at this time, the normal value n1 is output to the comparator 31 from the switch circuits 91, 92. Thereafter, when the count value K1 becomes equal to n1 at time t11, the output signal of the comparator 31 inverts from high level to low level.

When the reference clock CLK rises at time t12 following this inversion, the sync timing signal SY is output to a horizontal sync signal generator 7 from the flip-flop 32. Thus, there can be generated a horizontal sync signal HSYNC having a period Tn1 corresponding to the normal value Kn1.

Figure 6B:
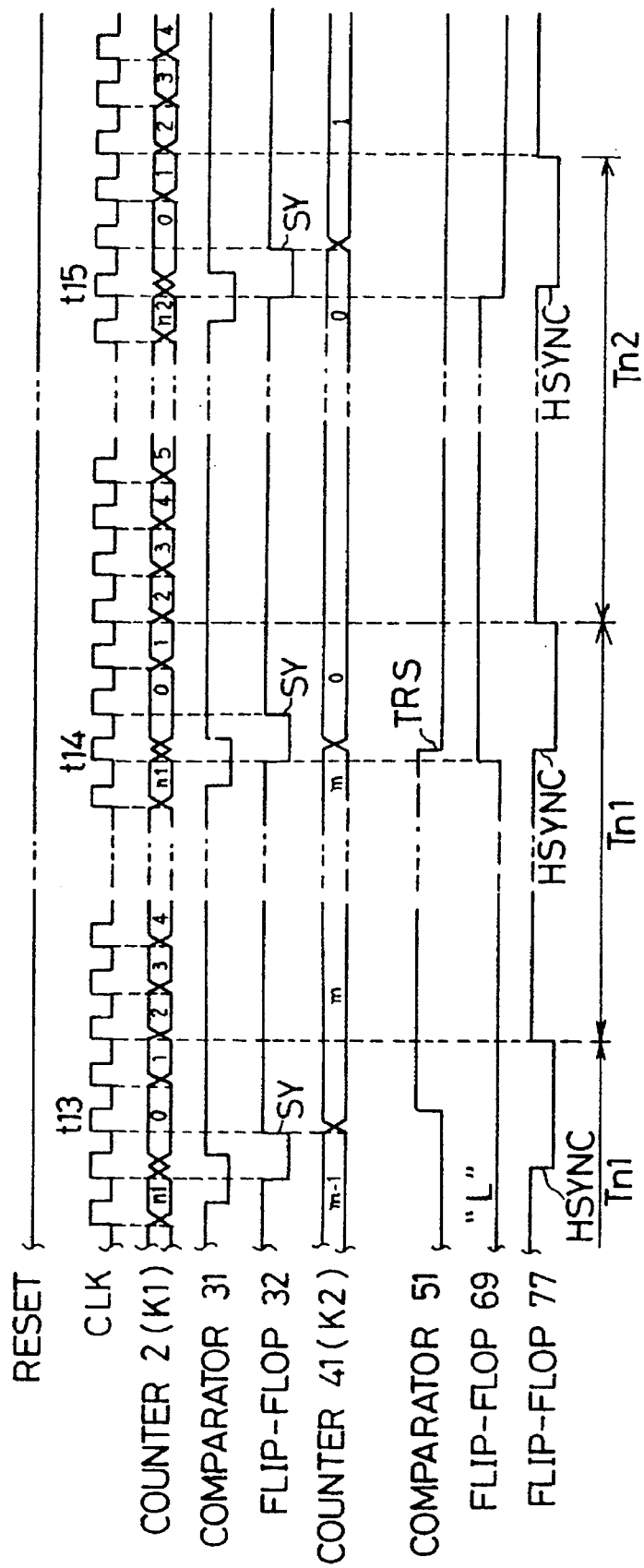

The horizontal sync signal HSYNC having the period Tn1 is generated repeatedly until the count value K2 of the counter 41 becomes equal to m as shown in FIG. 6B.

On the other hand, when the count value K2 becomes equal to m at time t13, a period change designation signal TRS is output from a comparator 51. At time t14, a high level signal is output to the switch circuits 91, 92 from the output terminal Q1 of the flip-flop 69. Thus, the corrected value n2 is output to the comparator 31 from the switch circuits 91, 92.

When the count value K1 becomes equal to n2 at time t15, the output signal of the comparator 31 inverts from high level to low level and thereby the sync timing signal SY is output to the horizontal sync signal generator 7 from the flip-flop 32. Thus, there can be generated a horizontal sync signal HSYNC having a period Tn2 corresponding to the corrected value n2.

At time t15, the high level signal is output to the switch circuits 91, 92 from the output terminal Q1 of the flip-flop 69, and thereby the normal value n1 is output to the comparator 31 from the switch circuits 91, 92 again. Thus, when the count value K1 becomes equal to n1, the horizontal sync signal HSYNC having the period Tn1 is generated again.

In this way, the period of the horizontal sync signal HSYNC is changed from the period Tn1 set in accordance with the normal value n1 to the period Tn2 set in accordance with the corrected value n2 each time the count value K2 of the sync timing signal SY used to generate the horizontal sync signal HSYNC becomes equal to m. Accordingly, it can be prevented to increase a shift amount of the period of the horizontal sync signal HSYNC relative to the required period greater than a predetermined level by changeably setting the normal value n1 and the corrected value n2.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A synchronization signal generating circuit for generating a synchronization signal used to output read data sequentially in a specified period, comprising:

clock generator means for generating a reference clock;

first counter means for counting the reference clock;

synchronization signal generator means for generating the synchronization signal in a first period in accordance with a count value of the first counter means;

second counter means for counting the generation of the synchronization signal;

reset means for resetting the second counter means when a count value of the second counter means reaches a specified value; and period changer means for controlling the synchronization signal generator means so as to generate the synchronization signal in a second period only when the count value of the second counter means reaches the specified value.

2. A circuit according to claim 1 wherein the synchronization signal generator means generates the synchronization signal each time the count value of the first counter means reaches a first predetermined value, and wherein the period changer means controls the synchronization signal generator means so as to generate the synchronization signal when the count value of the first counter means reaches a second predetermined value only if the count value of the second counter means reaches the specified value.

3. A circuit according to claim 1 wherein the synchronization signal generator means includes designation signal output means for outputting a designation signal and signal generator means for generating the synchronization signal upon the receipt of the designation signal, the designation signal output means including first output means for outputting the designation signal each time the count value of the first counter means reaches a predetermined value and second output means for outputting the designation signal at timing delayed by a specified number of reference clocks from the first output means, and wherein the period changer means connects switchingly the first and second output means only when the count value of the first counter means reaches the predetermined value.

4. A circuit according to claim 3 wherein the first output means outputs the designation signal in synchronism with a next reference clock when the count value of the first counter means reaches the predetermined value, and wherein the second output means outputs the designation signal in synchronism with a reference clock following the one in synchronism with which the first output means has outputted the designation signal.

5. A circuit according to claim 3 wherein the period changer means connects the second output means with the signal generator means only in the case where the count value of the first counter means reaches the predetermined value and connects the first output means therewith in other cases.

6. A circuit according to claim 3 wherein the period changer means connects the first output means with the signal generator means only in the case where the count value of the first counter means reaches the predetermined value and connects the second output means therewith in other cases.

* * * * *